United States Patent [19]
Egalon et al.

[11] Patent Number: 5,780,844
[45] Date of Patent: Jul. 14, 1998

[54] STRAIN INSENSITIVE OPTICAL PHASE LOCKED LOOP

[75] Inventors: Claudio O. Egalon, Hampton; Robert S. Rogowski, Yorktown, both of Va.

[73] Assignee: The United States of America as represented by the Administrator of the National Aeronautics and Space Administration, Washington, D.C.

[21] Appl. No.: 644,655

[22] Filed: Apr. 23, 1996

[51] Int. Cl.⁶ .............................. G01B 5/30; G02B 6/16
[52] U.S. Cl. ............................ 250/227.14; 385/12
[58] Field of Search .............. 250/227.14, 227.16, 250/227.17, 227.18, 227.19, 227.21, 227.23, 227.24, 227.27, 227.28, 227.11, 231.1, 229, 231.19; 385/12, 13, 27, 28, 123; 73/760, 768, 774, 800

[56] References Cited

U.S. PATENT DOCUMENTS

| | | |
|---|---|---|
| 4,427,263 | 1/1984 | Lagakos et al. ............... 385/128 |
| 4,709,987 | 12/1987 | Blackburn et al. ............. 385/141 |
| 4,770,492 | 9/1988 | Levin et al. ................. 250/227.14 |
| 4,843,346 | 6/1989 | Heyman et al. ............... 331/65 |
| 4,979,798 | 12/1990 | Lagakos et al. ............... 385/12 |
| 5,338,929 | 8/1994 | Douma et al. ................. 250/231.1 |
| 5,343,035 | 8/1994 | Egalon et al. ................ 250/227.14 |
| 5,363,463 | 11/1994 | Kleinerman et al. ........... 385/123 |
| 5,381,493 | 1/1995 | Egalon et al. ................ 385/13 |
| 5,488,475 | 1/1996 | Friebele et al. ............... 356/352 |

*Primary Examiner*—Edward P. Westin
*Assistant Examiner*—John R. Lee
*Attorney, Agent, or Firm*—Kimberly A. Chasteen

[57] ABSTRACT

A strain sensor uses optical fibers including strain insensitive portions and a strain sensitive portion. The optical fibers form a sensitive arm of an optical phase locked loop (OPLL). The use of the OPLL allows for multimode optical fiber to be used in a strain insensitive configuration. Only strain information for the strain sensitive portion is monitored rather than the integrated strain measurements commonly made with optical fiber sensors.

4 Claims, 2 Drawing Sheets

STRAIN INSENSITIVE OPTICAL PHASE LOCKED LOOP

ORIGIN OF THE INVENTION

The invention described herein was jointly made by an employee of the United States Government and a contract employee during the performance of work under NASA Contract No. NAS-1-19236. In accordance with 35 U.S.C. 202, the contractor elected not to retain title.

BACKGROUND OF THE INVENTION

1. Technical Field of the Invention

The present invention relates generally to distributed monitoring of strain in a structure through use of embedded or surface mounted optical fibers and specifically to strain monitoring with an optical phase locked loop (OPLL).

2. Discussion of the Related Art

Optical fibers may be attached to a structure for the purpose of monitoring strain. As the structure is strained, embedded fibers or fibers affixed to the surface of the structure will undergo strain as well. As the fibers are strained, the light transmission characteristics are altered in a known manner, allowing one to extract information about the strain in the structure.

Optical fibers may be generally classified as single mode, few mode or multimode fibers. These classes refer to the number of modes propagating through the fibers. The light transmitting cores of single mode fibers are very small, on the order of a few microns in diameter so that only one mode may be transmitted. These fibers are more expensive and more difficult to work with than larger, multimode fibers which usually have cores on the order of 100 microns. Few mode fibers fall between these two categories.

As a fiber is strained, the optical path length of light traveling through the fiber is altered. This produces a phase shift in the light exiting the receiving end of the fiber. It is by detecting the phase shift that strain information is extracted.

One simple example of the use of this is a pair of single mode fibers, one is attached to the test object and one is held as a reference. They are employed in an interferometer configuration and as the test object is strained the test fiber will also be strained. The reference fiber will not be subject to strain and through the use of the interferometer changes in phase may be compared between the two fibers.

One of the drawbacks of this type of monitoring is that the information about strain is necessarily integrated over the length of the detecting fiber. That is, since the phase change depends on the change in optical path length of the entire fiber, the strain information reflects strain in the entire fiber. In a test object having widely varying strain response or in an object in which strain is important at specific points rather than in the object as a whole, integrated measurements are not very useful.

Egalon, et. al. (U.S. Pat. No. 5,343,035, hereafter the '035 patent) disclose an optical fiber strain sensor for use in making measurements over a small region. The invention according to the '035 patent makes use of a strain insensitive optical lead fiber to carry a light signal to a strain sensitive optical fiber disposed in the region of interest of the test object. Thus the sensor is sensitive to strain only in the region occupied by the strain sensitive fiber and integrated information from the lead fiber is ignored. The invention according to the '035 patent requires that the sensing fiber be a two-mode optical fiber.

Lagakos, et. al. (U.S. Pat. No. 4,979,798) make use of lead optical fibers that are insensitive to strain in the region being monitored. This is achieved through the leads not being within the test region. This is not always a viable option when, for example, the test region lies within a larger region of a test structure which is itself undergoing strain.

Kleinerman (U.S. Pat. No. 5,363,463) makes use of optical time domain reflectometry (OTDR) to determine temperature measurements in selected areas of a test object. This method employs a fluorescent dye that will react in a temperature dependant manner in the presence of an interrogating light signal. The light given off by the fluorescent dye may then be monitored and its intensity and time of arrival give both a temperature reading and an indication of the location at which that temperature was measured. A drawback of OTDR methods is the expense of the electronic processing elements that are necessary.

Kleinerman additionally discusses monitoring of microbends within a fiber. In the case of microbend information it is often practical to monitor backscattered light. Again, through the use of OTDR it is possible to find the locations of multiple microbends as revealed by discontinuities in the backscatter intensity versus a known distance decay curve.

SUMMARY OF THE INVENTION

It is an object of the present invention to provide an optical fiber arrangement that may be used to sense strain and vibration at specific locations within a test object.

It is an additional object of the present invention to use multimode optical fibers to achieve the above object.

It is a further object of the present invention to achieve the forgoing objects without the use of OTDR methods which require expensive electronic elements.

To achieve the forgoing objects, strain insensitive optical fiber is used to carry a light signal to a strain sensitive optical fiber. Information from the strain sensitive fiber travels through strain insensitive fiber to a detector. Since the leads are chosen to be strain insensitive, strain in the region of interest is the only contribution to the signal. The signal from the sensor is monitored in an optical phase locked loop (OPLL). The use of the OPLL allows for use of multimode fibers instead of the single or few mode fibers used in other optical fiber monitoring devices.

DESCRIPTION OF PREFERRED EMBODIMENTS

Figure 1:
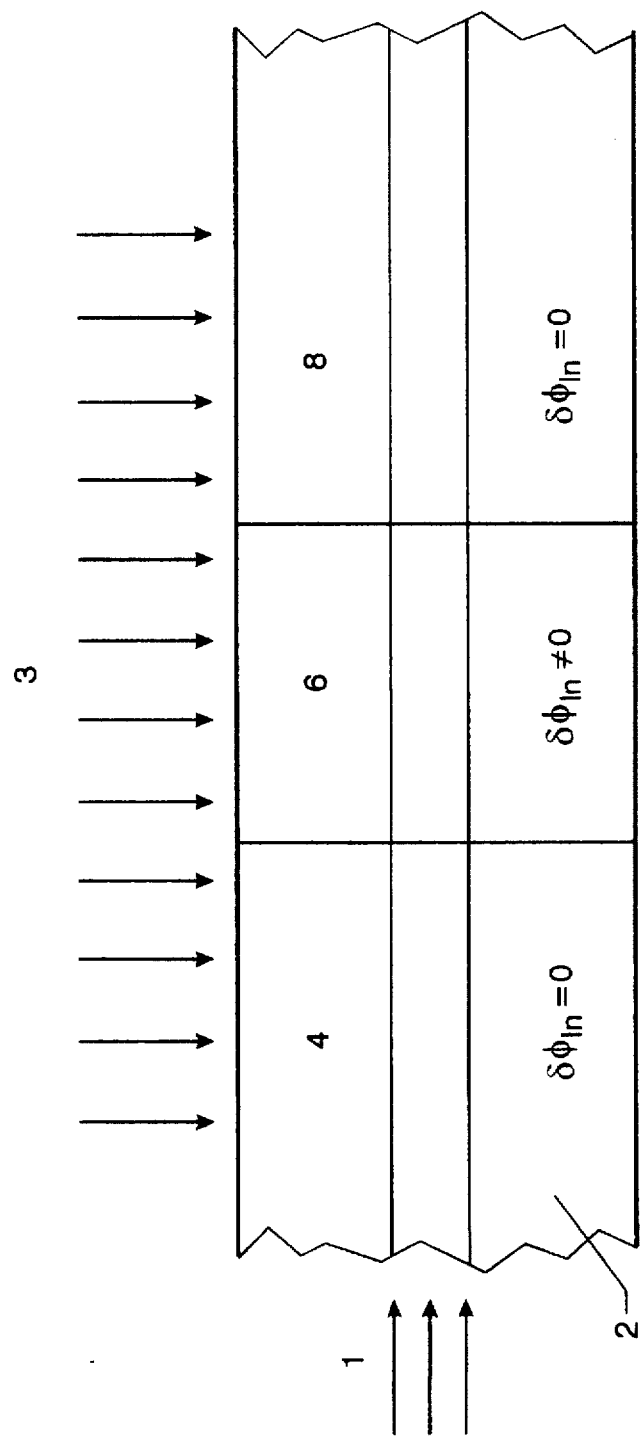
FIG. 1 is a drawing showing a fiber having a strain sensitive region and strain insensitive regions of the fiber carrying an optical signal to and from the strain sensitive region.

Referring first to FIG. 1, a multimode optical fiber sensor is shown. The multimode optical fiber sensor 2 is made up of a strain insensitive fiber 4 leading to a strain sensitive fiber 6 located in the region being monitored and a second strain insensitive fiber 8 leading away from the strain sensitive fiber. For example the three fibers may be connected by splicing. Light 1 enters the sensor and strain 3 is applied.

Figure 2:
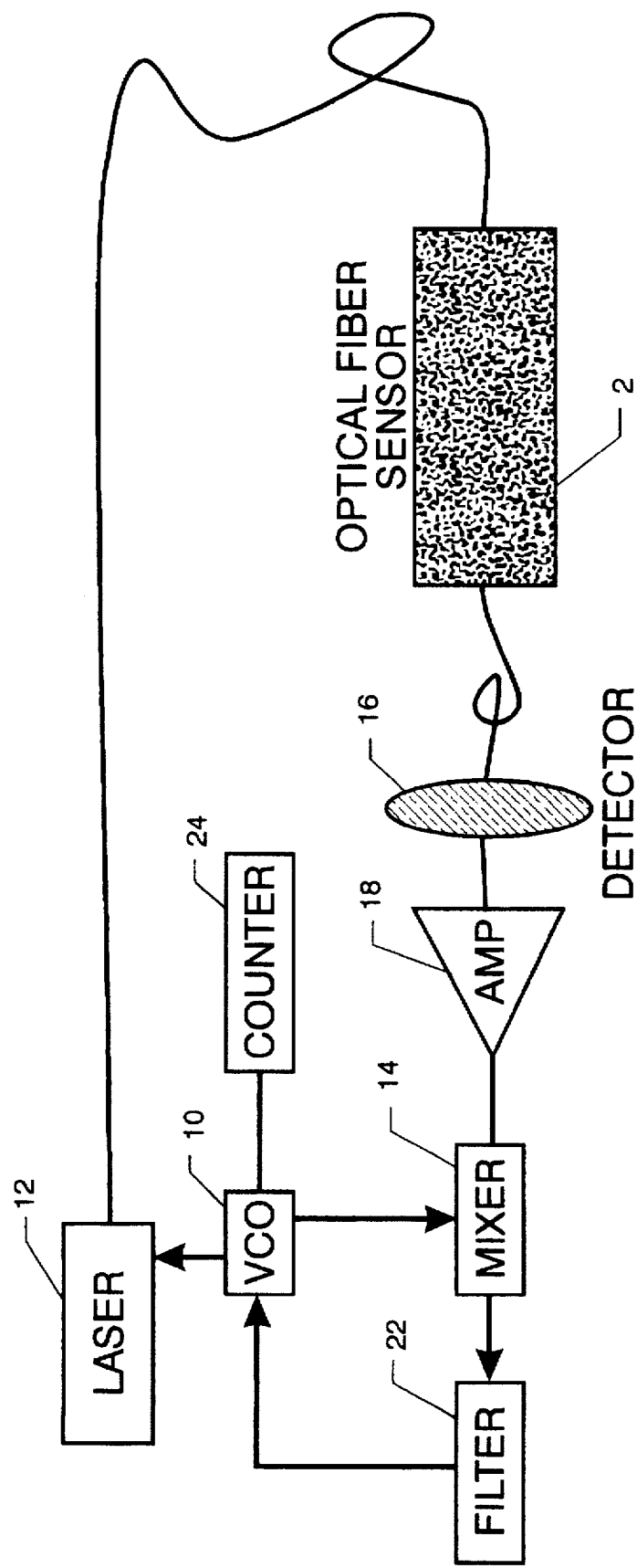
FIG. 2 is a drawing showing a system according to the present invention in an OPLL configuration.

A voltage controlled oscillator 10 is used to directly modulate a laser 12 and to provide a reference signal to a double balanced mixer 14, as shown in FIG. 2. The laser radiation passes through a multimode optical fiber sensor 2.

The second strain insensitive fiber 8 leads to a detector 16. The detected signal passes through an amplifier 18, the amplified signal passes through the mixer 14 and is mixed with the reference signal. The phases of the two signals are maintained at quadrature by feedback of the DC error voltage from the mixer 14 to the oscillator 10. A filter 22 removes the radio frequency component coming from the mixer 14.

A change in the phase of the modulation is expressed as an error voltage at the mixer 14 and is compensated by a change in the modulation frequency. A change in phase length, $\Delta L$, of the optical fiber will produce a change in frequency, $\Delta F$, according to:

$$\frac{\Delta L}{L} = -\frac{\Delta F}{F} \quad (1)$$

Where L is the effective path length of the strain sensitive optical fiber 6 and F is the nominal frequency value. Frequency is monitored by a counter 24.

An important consideration is the strain insensitive optical fibers 4 and 8. The phase shift due to strain in the OPLL is given by:

$$\delta\phi_{in} = \frac{\omega z}{2c} S_1 n_{core}(2 - P_{eff} n_{core}^2) \quad (2)$$

$$P_{eff} = \frac{(P_{12} - v_f(P_{11} + P_{12}))}{2} \quad (3)$$

Where $P_{11}$ and $P_{12}$ are the strain optic coefficients of the fiber, $V_f$ is the Poisson's ratio of the fiber, $\omega$ is the frequency of modulation of the laser, c is the speed of light, z is the length of the fiber under strain, $S_1$ is the value of axial strain and $n_{core}$ is the refractive index of the fiber core. The fiber is assumed to be weakly guiding, that is, it meets the inequality:

$$\frac{n_{core}^2 - n_{clad}^2}{2n_{core}^2} \leq 0.01 \quad (4)$$

From the above, it is evident that a fiber can be made more or less sensitive by choosing appropriate optical fiber parameters. So, for a strain insensitive fiber, the core refractive index must be given by:

$$n_{core} = \sqrt{\frac{2}{P_{eff}}} \quad (5)$$

While for strain sensitive fiber it is best to maximize Eqn. 2.

Using appropriate parameters in Eqn. 5 it is determined that a strain insensitive fiber is one with a very high core refractive index, e.g. $n_{core} \approx 4.5$. Germanium, for example is an appropriate material for producing multimode optical fibers with very high refractive index.

Other variations and uses will be apparent to those skilled in the art. The above embodiments are not exhaustive but rather are given by way of example. It is understood that the present invention is capable of numerous modifications within the scope of the following claims.

We claim:

1. A strain sensor comprising:
   an optical phase locked loop comprising a strain sensitive arm; the strain sensitive arm of the optical phase locked loop comprising:
      a strain sensitive, multimode optical fiber, and
      at least one strain insensitive, multimode optical fiber disposed to transmit light passing through said strain sensitive, multimode optical fiber.

2. A strain sensor as recited in claim 1 herein the strain insensitive, multimode optical fiber is chosen to have a core refractive index given by the equation:

$$n_{core} = \sqrt{\frac{2}{P_{eff}}} ,$$

where $P_{eff}$ is the effective strain optical coefficient of the fiber and $n_{core}$ is the refractive index of the fiber core.

3. A strain sensor as recited in claim 1 wherein the strain sensitive, multimode optical fiber is chosen to have a core refractive index determined by maximizing the equation:

$$\delta\phi_{in} = \frac{\omega z}{2c} S_1 n_{core}(2 - P_{eff} n_{core}^2),$$

where $\delta\phi_{in}$ is a phase shift due to strain, $\omega$ equals frequency of modulation of a laser, c equals speed of light, z equals length of the fiber under strain, $S_1$ equals value of axial strain, $n_{core}$ is the core refractive index, and $P_{eff}$ is the effective strain optical coefficient of the fiber.

4. A strain sensor as recited in claim 1 wherein the optical phase locked loop further comprises:
   light producing means for injecting light into the strain insensitive, multimode optical fiber;
   detecting means positioned to accept light that has passed through the strain sensitive, multimode optical fiber;
   means for controlling the light producing means in a phase locked, frequency modulating, feedback arrangement; and,
   means for monitoring a change in modulating frequency, indicating strain in the strain sensitive, multimode optical fiber;
   the means for controlling the light producing means in a phase locked, frequency modulating, feedback arrangement comprising:
      an amplifier, for amplifying a signal from the detecting means;
      a voltage controlled oscillator, the voltage controlled oscillator directly controlling the light producing means, and further providing a reference signal;
      a mixer, mixing output from the amplifier with the reference signal and producing a mixed output signal;
      a filter, removing a radio frequency noise component from the mixed output signal and producing a filtered, mixed signal; and
      the filtered, mixed signal controlling the voltage controlled oscillator.

* * * * *